April 7, 1953     J. P. HOWE ET AL     2,633,740

LEAKAGE TESTING METHOD

Filed April 26, 1945

Inventors:
John P. Howe
Alden B. Greninger
Robert F. Plott
By: Robert A. Lavender
Attorney.

Patented Apr. 7, 1953

2,633,740

UNITED STATES PATENT OFFICE 2,633,740

LEAKAGE TESTING METHOD

John P. Howe, Alden B. Greninger, and Robert F. Plott, Chicago, Ill., assignors to the United States of America as represented by the United States Atomic Energy Commission Application April 26, 1945, Serial No. 590,426

3 Claims. (Cl. 73—40)

Our invention relates to a method for testing for leaks in a jacketed body. More specifically, it relates to a method for testing by means of air pressure whether or not a seam weld on a sheath or jacket closely surrounding a body is airtight or free from leaks.

In the past, various apparatus and methods have been used for detecting leaks through containers and the like. For example, a common method is to submerge such containers in a liquid in a chamber that is subsequently evacuated and then note whether bubbles escape through the liquid to the surface thereof. This and similar methods have not been found to be sufficiently reliable and satisfactory for the purpose of the present invention.

An object of our invention is to provide an efficient and reliable method for testing a jacketed body for airtightness, particularly the seam weld that seals the portions forming the jacket.

Other objects and advantages will become more apparent from the following description taken together with the drawing wherein.

Figure 1:
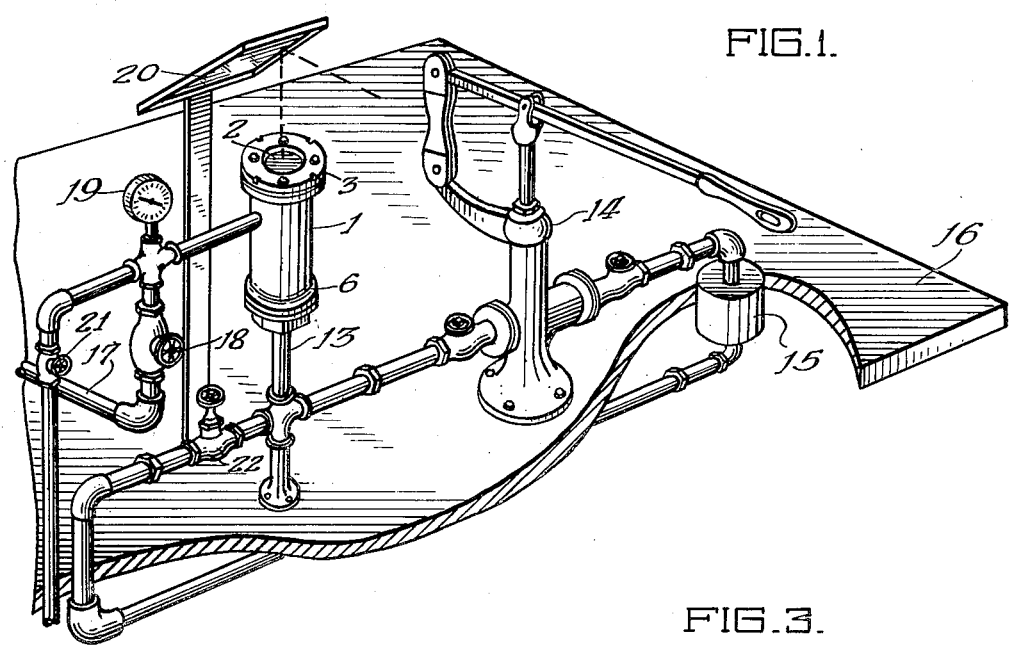
Fig. 1 is a perspective view of an apparatus used for carrying out the method following the teachings of our invention.
Figures 2, 3:
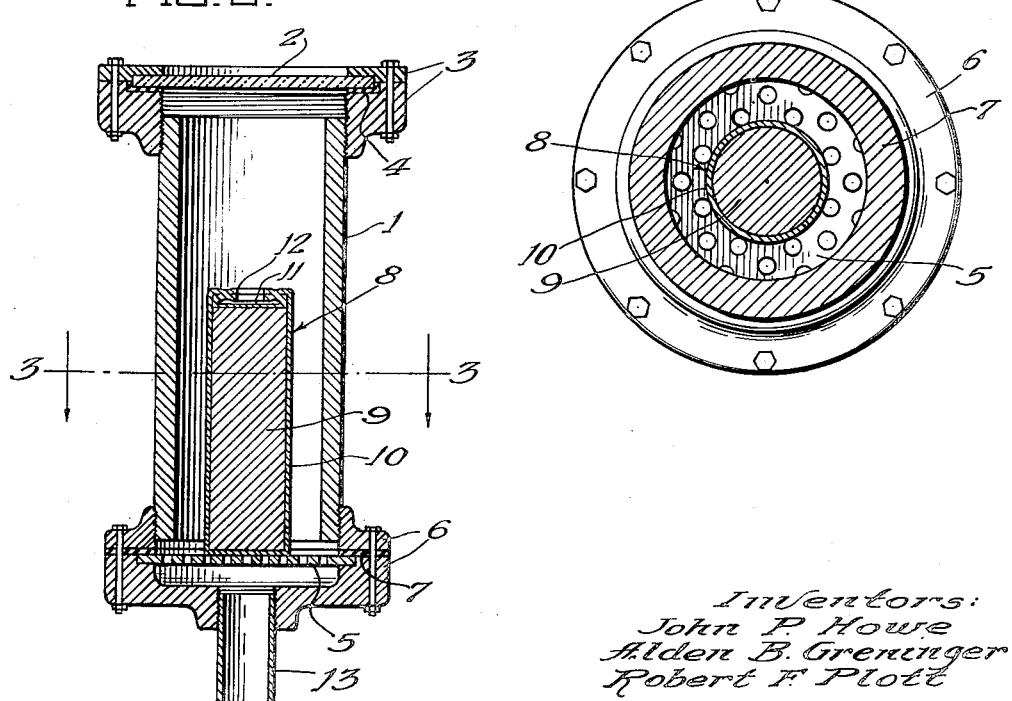
Fig. 2 is an enlarged cross-sectional view of the chamber shown in Fig. 1.
Fig. 3 is an enlarged cross-sectional view taken along line 3—3 of Fig. 2.

Referring more particularly to the drawings, numeral 1 denotes a vessel or chamber having a transparent top or window 2 of glass, plastic or other suitable material, clamped between two top flanges 3 and sealed by an intermediate gasket 4 of any suitable sealing material such as neoprene. A perforated bottom plate 5 is similarly supported, namely between two bottom flanges 6 and is sealed by an intermediate gasket 7.

A jacketed body 8, to be tested, comprises a slug 9 of uranium or other suitable material surrounded by a jacket of aluminum or other suitable material. The jacket is formed of jacket portions 10 and 11 seam welded at 12, namely adjacent the end edges of the inturned portions of jacket portions 10 and 11.

The apparatus shown in Fig. 1 will be better understood by considering the method used for detecting leaks in the jacketed body 8.

The jacketed body 8 is first introduced into chamber 1 by removing window 2 after uncoupling the flanges 3. Window 2 is then clamped in place and a suitable bubble forming liquid, such as, for example, kerosene, particularly odorless kerosene, is pumped into chamber 1 through an inlet pipe 13 by means of a pump 14 from a kerosene reservoir 15 while valve 22 is closed. The apparatus is supported on a table 16 as indicated with the seam weld 12 uppermost as indicated. The level of the kerosene is raised preferably to from 1 to ½ inch below the top of jacketed body 8. Air pressure, for example, of about 80 pounds per square inch from a supply line 17 is then introduced into the chamber 1 by opening a valve 18 and the pressure is indicated on dial gauge 19. The air pressure is slowly increased to the desired pressure and held for roughly 15 seconds after which valve 18 is closed. Pump 14 is then operated manually to raise the level of the kerosene in chamber 1 to cover the top of the jacketed body 8, preferably to a level at least ½ inch above the weld 12. By means of an inclined mirror 20, the interior of chamber 1 and the kerosene level may be readily observed by the operator, who then suddenly releases or reduces the pressure in chamber 1 by rapidly opening a bleeder valve 21 and noting whether or not bubble streams rise to the surface of the liquid in chamber 1. If such bubble streams do occur as the result of removal of the gas pressure, the bubbles are indicative of the fact that there is a leak in the jacket 10—11 of the slug. In other words, if, for example, the seam weld at 12 is faulty and leaks when the air pressure is initially introduced into chamber 1, the air will leak through such leak to the interior of the sheath 10—11 so that subsequently, after the seam weld 12 is covered with liquid and the air pressure removed, the pressure interiorly of the jacket 10—11 will exceed that of the reduced air pressure in chamber 1 resulting in the release of bubbles from the leak to rise to the surface of the liquid. In so doing, the leak will be readily observed by the operator with the aid of mirror 20 and window 2. The liquid level in container 1 may then be lowered by opening valve 22. The body 8 may then be removed by removing window 2. If desired, reference lines may be applied to the top of the jacketed body 8 so as to be able to identify the location of leaks, especially those of long duration, as the result of the above-described method.

Thus, it will be seen that we have provided an efficient and reliable method for detecting leaks in a jacketed slug, the jacket of which is intended to be airtight by means of seam welding or the like.

It should be noted that modifications may be readily suggested to those skilled in the art after having had the benefit of the teachings of our invention. For example, other liquids than kerosene, such as a soap solution, may be used. Likewise, objects other than jacketed slugs may be tested, such as, for example, ordinary containers intended to be gastight. For this reason the invention should not be restricted except insofar as set forth in the following claims.

What is claimed is:

1. The method of testing for leaks through a weld at one end of a jacketed body, comprising placing the body in a chamber with the weld uppermost, introducing a liquid into said chamber to a level slightly below that of the weld, introducing gas pressure into said chamber, raising the level of said liquid so that it will be higher than said weld, releasing said gas pressure and noting whether any bubbles enter the liquid as the result of the existence of leaks through said seam weld.

2. The method of testing for leaks in the jacket of a jacketed body comprising placing the body in a transparent chamber, introducing a gas under pressure into said chamber, introducing a liquid into said chamber to a level submerging the body while maintaining the pressure within the chamber, and then releasing the pressure, whereby the presence of any leak in the jacket is indicated by bubbles in the liquid.

3. The method of testing for and locating leaks in a container comprising the steps of placing the container in a transparent chamber, submerging all but a portion of the container in a liquid, introducing a gas under pressure into said chamber, completely submerging the container under the liquid while maintaining the pressure, and then releasing the pressure, whereby only leaks in said portion of the container will be indicated by bubbling in the liquid.

JOHN P. HOWE.
A. B. GRENINGER.
ROBERT F. PLOTT.

REFERENCES CITED

The following references are of record in the file of this patent:

UNITED STATES PATENTS

| Number | Name | Date |
|---|---|---|
| 1,370,437 | Gustafson | Mar. 1, 1921 |
| 1,378,215 | Burns | May 17, 1921 |
| 1,590,736 | Clark | June 29, 1926 |
| 1,950,304 | High | Mar. 6, 1934 |
| 2,055,568 | Wilsdorf | Sept. 29, 1936 |
| 2,296,852 | Horner | Sept. 29, 1942 |
| 2,407,945 | Bennett | Sept. 17, 1946 |

FOREIGN PATENTS

| Number | Country | Date |
|---|---|---|
| 537,588 | Great Britain | June 27, 1941 |